United States Patent [19]

Delyani et al.

[11] Patent Number: 4,736,318

[45] Date of Patent: Apr. 5, 1988

[54] DATA PROCESSING SYSTEM HAVING TUNABLE OPERATING SYSTEM MEANS

[75] Inventors: Dino Delyani, Arlington; Charles E. Jablow, Somerville, both of Mass.

[73] Assignee: Wang Laboratories, Inc., Lowell, Mass.

[21] Appl. No.: 707,304

[22] Filed: Mar. 1, 1985

[51] Int. Cl.$^4$ ............................................. G06F 15/16
[52] U.S. Cl. ..................................................... 364/200
[58] Field of Search ................ 364/200 MS File, 300, 364/900 MS File

[56] References Cited

U.S. PATENT DOCUMENTS

| | | | |
|---|---|---|---|
| 3,686,641 | 8/1972 | Logan et al. | 364/200 |
| 4,177,513 | 12/1979 | Hoffman et al. | 364/200 |
| 4,183,083 | 1/1980 | Chatfield | 364/200 |
| 4,387,427 | 6/1983 | Cox et al. | 364/200 |
| 4,481,583 | 11/1984 | Mueller | 364/300 |

OTHER PUBLICATIONS

Sherrod, P., et al., "Minicomputer System Offers Time-Sharing and Realtime Tasks", Computer Design, Aug. 1984, pp. 223–228.
Sastry, K. V., "Process Management In a Paging Machine", IEEE, 1979, pp. 198–204.
Lipton, Richard et al., "Response Time of Parallel Programs", Proceedings of the 1977 International Conference on Parallel Processing, 1977, Pub. by IEEE, pp. 234–242.
Arato, M., et al., "Performance of Computer Systems", Pub. by North-Holland Publishing Co., 1979, pp. 181–260.

Primary Examiner—Gareth D. Shaw
Assistant Examiner—Jonathan C. Fairbanks
Attorney, Agent, or Firm—Michael H. Shanahan

[57] ABSTRACT

A tunable operating system in a multiprogrammed data processing system prevents lockout of I/O bound tasks of low priority by CPU bound tasks of high priority. A range signal in the master control block and a range divider signal in each task control block together define a queue subset for each task. The queue subsets for different tasks are overlapped by at least one queue, and preferably by at least three queues. A plurality of time-slice values, preferably two, are assigned when tasks are dispatched; the time-slice values are assigned with respect to the task range divider signal and therefore are not fixed with respect to each queue. The invention permits the weight given to the user-set task priority and to the priority based on recent task behavior to be varied as desired. The range value, the divider values, and the time-slice values are variable to permit tuning of the operating system.

13 Claims, 2 Drawing Sheets

| QUEUE | FG/VH | FG/H | FG/M | FG/L | BG/VH | BG/H | BG/M | BG/L |
|---|---|---|---|---|---|---|---|---|
| 4  | 8  |    |    |    |    |    |    |    |
| 5  | 8  | 8  |    |    |    |    |    |    |
| 6  | 8  | 8  | 8  |    |    |    |    |    |
| 7  | 8  | 8  | 8  | 8  |    |    |    |    |
| 8  | 8  | 8  | 8  | 8  | 8  |    |    |    |
| 9  | 8  | 8  | 8  | 8  | 8  | 8  |    |    |
| 10 | 8  | 8  | 8  | 8  | 8  | 8  | 8  |    |
| 11 | 45 | 8  | 8  | 8  | 8  | 8  | 8  | 8  |
| 12 | 45 | 45 | 8  | 8  | 8  | 8  | 8  | 8  |
| 13 | 45 | 45 | 45 | 8  | 8  | 8  | 8  | 8  |
| 14 | 45 | 45 | 45 | 45 | 8  | 8  | 8  | 8  |
| 15 | 45 | 45 | 45 | 45 | 45 | 8  | 8  | 8  |
| 16 | 45 | 45 | 45 | 45 | 45 | 45 | 8  | 8  |
| 17 |    | 45 | 45 | 45 | 45 | 45 | 45 | 8  |
| 18 |    |    | 45 | 45 | 45 | 45 | 45 | 45 |
| 19 |    |    |    | 45 | 45 | 45 | 45 | 45 |
| 20 |    |    |    |    | 45 | 45 | 45 | 45 |
| 21 |    |    |    |    |    | 45 | 45 | 45 |
| 22 |    |    |    |    |    |    | 45 | 45 |
| 23 |    |    |    |    |    |    |    | 45 |

DATA PROCESSING SYSTEM HAVING TUNABLE OPERATING SYSTEM MEANS

The present invention relates to improvements in operating systems for multiprogrammed data processing systems.

BACKGROUND OF THE INVENTION

A multiprogrammed data processing system has a number of programs in memory at the same time; this permits the central processor to be shared among them. This scheme improves the overall efficiency of the computer system by getting more work done in less time. The benefits of multiprogramming are increased utilization of the central processor and high total job throughput.

The objective of multiprogramming is to have a task running at all times, in order to maximize utilization of the central processor. If there are more than one task, the rest must wait until the processor is free and can be rescheduled. Means must be provided for deciding which waiting task will next receive the service of the central processor; this is the function of the scheduling and dispatching portions of the operating system.

Many scheduling methods are known in the art, providing a plurality of queues of different priorities; tasks are assigned user-set priorities, which determine the initial queue assignment. The dispatch priority of the task is further refined in response to its behavior as it proceeds.

It has been found in practice that problems can occur when a heavily loaded system is running a mix of tasks. It is possible for certain tasks of relatively low priority, but requiring only a small amount of service from the central processor before giving up control of the central processor in order to get an input-output service ("I/O bound" task), to be prevented from obtaining such service because the central processor is preferentially assigned to a higher priority task which requires a large amount of service from the central processor before giving up control ("CPU bound" task). This is generally an undesirable condition.

It is therefore an object of the invention to provide an improved operating system means that can prevent a task having a relatively low user-set priority but having I/O bound behavior from being locked out by a task having a relatively high user-set priority but having CPU bound behavior. It is a further object of the invention to maximize the throughput of a multiprogrammed data processing system running a mix of I/O bound and CPU bound tasks.

The invention is practiced in a multiprogrammed data processing system for the execution of a plurality of concurrent tasks, having timer means, storage means, input/output means, and central processing means for controlling the data storage means and the input/output means, and providing state register means. The data storage means has means for providing signals representing operating system means for the control of the data processing system, storage elements for signals defining a master control block data structure associated with operation of the central processing means under control of the operating system means, and storage elements for signals defining a plurality of task control block data structures.

Each task control block data structure is associated with one of a plurality of concurrent tasks in the data processing system, and has an associated address value representing its location within the data storage means. Each task control block data structure provides storage elements for state signals representing a current execution state of the associated task, and a priority storage element for storing a dispatch priority signal corresponding to a dispatch priority value.

The master control block data structure provides a plurality of queue storage elements for signals representing particular address values, the storage elements identifying the head and tail of at least one chained I/O wait queue representing tasks queued for service by the input/output means, and identifying the head and tail of each of N successive chained ready queues representing tasks queued to be served by the central processing means. Each ready queue has a queue priority for such service associated with its position from O to N-1, which also defines the relative priority of the queue. We will here adopt the convention that lower numbered queues have better priority (ie, are served sooner) and higher numbered queues have worse priority (ie, are served later). The queue priorities together with the positions of the tasks within the ready queues together identify a next task.

The operating system means comprises dispatcher means, scheduler means, input/output routine means, and interrupt handling means. The dispatcher means comprises means responsive to a dispatch signal for retrieving from the ready queues, address value signals representing the location of the task control block associated with the identified next task; and means responsive to the retrieved address value signals for retrieving the state signals from the associated task control block, and placing the retrieved state signals into the central processing means state register means, thereby giving control of the central processing means to the next task.

The input/output routine means is responsive to signals from the central processing means representing a call from an executing task for service by the input/output means for placing the associated address value signals of the tail of an I/O queue; the scheduler means is responsive to the calling task dispatch priority signal representative of an old dispatch priority value for resetting the dispatch priority signal to represent a new higher dispatch priority value, and for providing the dispatch signal.

The interrupt handling means is responsive to an I/O interrupt signal representing completion of an input/output function for one of the concurrent tasks, for providing a first interrupt handling means signal; the scheduler means is responsive to the first interrupt handling means signal and to the dispatch priority signal of the task control block associated with the one task, for placing associated address value signals at the tail of a corresponding ready queue.

The data storage means further provides a time interval limiting value signal. The timer means is responsive to the dispatcher means for awaiting completion of a time interval defined by the time interval limiting value signal and commencing when the retrieved state signals are placed in the state register means, and is responsive to the completion of the time interval for providing a timer interrupt signal.

The interrupt handling means is responsive to the timer interrupt signal for discontinuing execution of the currently executing task, for retrieving the current state signals from the central processing means, for placing the state signals into the task control block storage elements of the task control block associated with the discontinued task, and for providing a second interrupt handling means signal to the scheduler means.

The scheduler means is responsive to the second interrupt handling means signal and to the discontinued task dispatch priority signal representative of an old dispatch priority value for resetting the dispatch priority signal to represent a new lower dispatch priority value, and for placing address signals associated with the task control block of the discontinued task at the tail of a the ready queue corresponding to the new dispatch priority value.

According to the present invention, the data storage means further provides at least one radius storage element providing a queue radius signal, the queue radius signals together being representative of a total number of queues M less than N. Each task control block has a queue range divider storage element providing a queue range divider signal, the divider signal being derived from a user-set priority for the associated task.

The range divider signal and the range radius signals together define for each task a subset of queues divided into upper and lower ranges, and including highest and lowest priority queues for the task, the queue subset of any concurrent task having at least one queue in common with the queue subset of any other concurrent task, providing overlapped queue subsets.

For each task, the scheduler means is additionally responsive to the queue range divider signal and the queue radius signals for placing the associated task control block address signals in a particular ready queue within the queue subset defined for the task.

Further according to the present invention, the data storage means further provides a plurality of time-slice storage elements providing a plurality of discrete time-slice values, including a shortest and a longest time-slice value and monotonically increasing therebetween. For each task, the dispatcher means is responsive to the queue range divider signal and to the queue radius signal for providing a time interval limiting value signal responsive to the shortest time-slice value when the task control block address signals are retrieved from the highest priority queue in the subset, and providing a time interval limiting value signal responsive to the longest time-slice value when the task control block address signals are retrieved from the lowest priority queue in the subset, and providing time interval limiting value signals responsive to the monotonically increasing time-slice values corresponding to the remaining queues of the subset of monotonically decreasing priority.

In preferred embodiments, the data storage means further provides first and second time-slice value storage elements providing first and second time-slice signals, representing values of shorter and longer time-slices respectively. For each task, the dispatcher means is responsive to the queue range divider signal and to the queue radius signal for providing a time interval limiting value signal responsive to the first time-slice value signal when the task control block address signals are retrieved from a ready queue in the queue subset upper range, and providing a time interval limiting value signal responsive to the second time-slice value signal when the task control block address signals are retrieved from a ready queue in the queue subset lower range. The task range divider values and the radius values are related such that any task to be dispatched with the first time-slice value can be assigned to a queue having priority at least equal to that of the highest priority queue to which any other task to be dispatched with the second time-slice value can be assigned.

Preferably, the first time-slice represents a value of between $\frac{1}{4}$ and 1 times the average CPU burst time of the I/O bound tasks concurrently running in the data processing system, and the second time-slice signal represents a value of between $\frac{1}{4}$ and 1 times the average CPU burst time of the CPU bound tasks concurrently running in the data processing system.

Other objects, features and advantages will appear from the following description of a preferred embodiment of the invention, together with the drawing, in which:

DETAILED DESCRIPTION OF THE INVENTION

Figure 1:
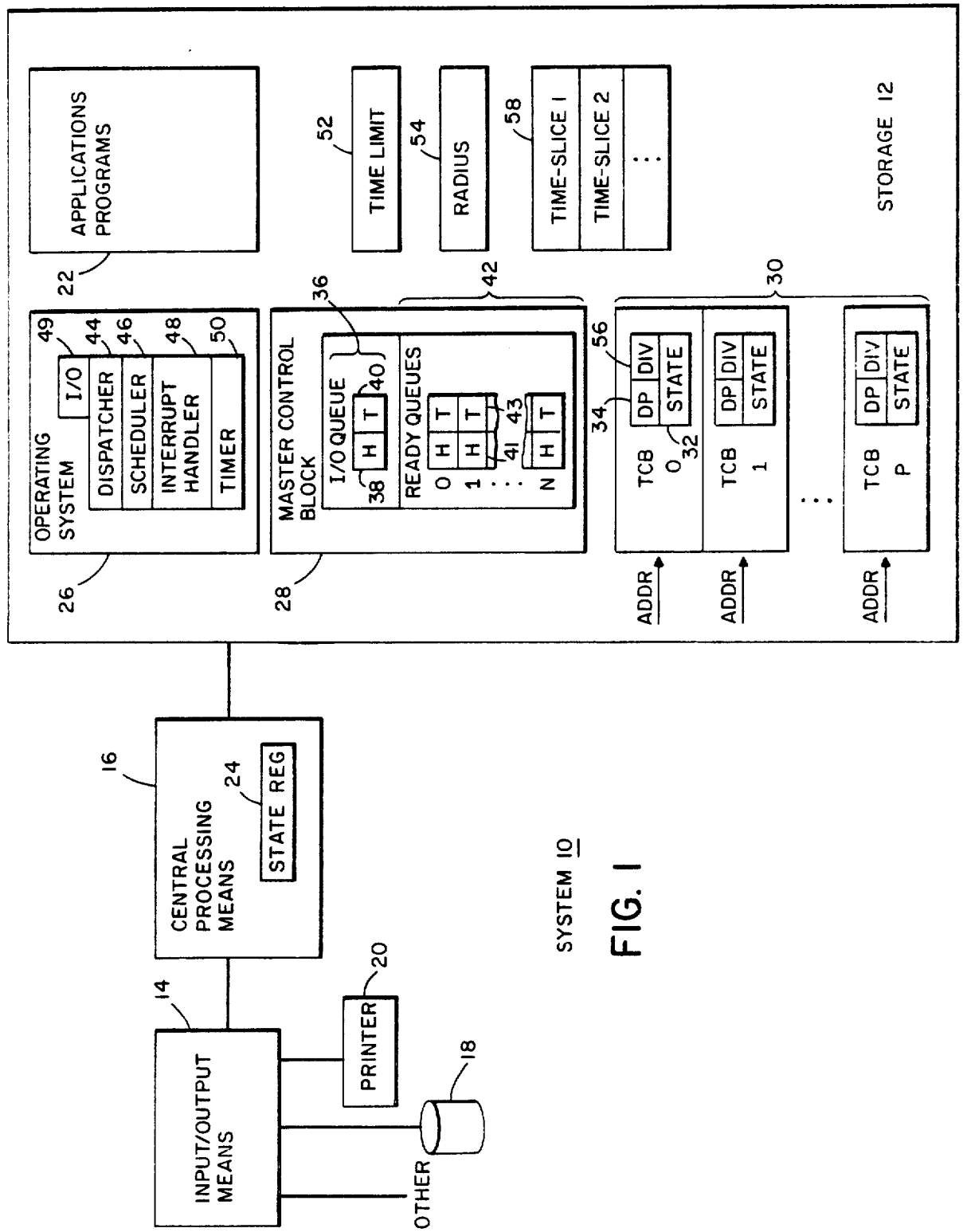
FIG. 1 shows the data processing system in which the present invention is practiced, including the allocation of portions of storage.

Referring now to the drawing, and in particular to FIG. 1, the present invention operates in a data processing system 10, having storage means 12, input/output means 14, and central processing means 16.

CPU. Central processing means 16 operates to control the operation of system 10. In particular, central processing means 16 is constructed and connected to control storage means 12 for placing signals therein representative of data or retrieving such signals therefrom. ("Data" is used herein to refer both to programs and to computational or other data operated on by such programs.) Central processing means 16 is further constructed and connected to control input/output means 14 to provide I/O functions. For example, devices such as disks 18, printers 20, or other devices such as a keyboard, a monitor, or a telecommunications link (not shown) are controlled by means 14.

Operating system. Storage means 12 provides means 26 for providing signals representing an operating system program. Further, storage means 12 provides storage elements at 28 for signals defining a master control block data structure associated with the processing means 16 operating under the control of the operating system program. (If system 10 has more than one processor, there will be more than one master control block.) Under control of the operating system program, with reference to signals stored at master control block 28, central processing means 16 controls means 12 and means 14 as previously described, and also provides other system services not pertinent herein.

Applications programs. Storage means 12 further provides means at 22 for providing signals representing various applications (user) programs. Central processing means 16, when controlled by such an applications program, executes the program in a manner well understood in the computer art, either by performing computational operations prescribed by the program or by requesting and performing operating system services such as a function of I/O means 14.

Tasks. A "task" is defined as a stream of work; successive programs may be executed, each successively identified with a common ongoing task. In a multiprogrammed data processing system, a plurality of concurrent tasks are present and ongoing in the system, each requiring a share of the services of central processing means 16. Such tasks may be applications (user) programs such as those at 22. A particular interactive user or a particular workstation may be regarded as a task, for which various programs are successively executed. A workstation is an interactive or "foreground" task; a program running in batch (noninteractive) mode is a "background" task.

Task control blocks. Storage 12 provides storage elements at 30 for signals representing task control block data structures. Each task control block data structure O through P is associated with one of a plurality P of concurrent tasks or tasks present in system 10. A task control block is initially provided at the time when a task is "created" or recognized as present by system 10. Each task control block data structure has an associated address value representing its location within storage means 12.

Each task control block data structure provides storage elements 32 for state signals representing a current (or most recent) execution state of the associated task.

CPU state registers. Central processing means 16 has state register means 24, for providing signals representative of the current execution state of a task currently controlling means 16. The current execution state signals provide whatever information is required to control the central processor in accordance with a program, such as the address of the next instruction, the contents of various registers, and the like. When a task is given control of the central processing means 16, such state signals are loaded from its associated task control block at 30 into state register means 24, and the task is said to be "dispatched".

Queues. Means must be provided for deciding, and thereafter recognizing, which concurrent task will next be given control of central processing means 16, or will obtain the services of system I/O devices. For this purpose, master control block 28 provides a plurality of queue storage elements. As is well understood in the art, a chained queue is provided by storing signals representative of the address value of a task control block for a task at the head of the queue. That task control block stores signals representative of the address value of the task control block for the next task in the queue. Successive tasks are thus chained together. Signals representative of the address value of the task control block of the last task in the queue are stored in the queue storage elements as the tail of the queue.

Thus, the I/O wait queue 36 provides storage elements for a header address 38 and a tail address 40 for a chained I/O queue; one such queue may be provided for each I/O device, but only a single, exemplary I/O queue is shown herein. Other wait queues may also be provided.

Ready queues. Further, master control block data structure 28 provides queue storage elements at 42 for signals identifying the head and tail of each of N successive chained ready queues representing tasks queued to be served by central processing means 16. Each ready queue has a queue priority for such service associated with its position from O to N-1. The queue with position O is considered to have the highest priority. The queue priorities together with the positions of the tasks within the chained ready queues together identifying a next task, that is, the task which will be given control of central processing means 16 when it is next available.

Dispatch priority. Each task control block data structure 30 provides a priority storage element 34 for storing dispatch priority signals corresponding to a dispatch priority value. When a task is "created" or first recognized as being present in system 10, signals representing a default priority value are provided at 34, in a manner not pertinent herein, but commonly responsive to a user-set priority or to the distinction between foreground and background tasks.

Scheduling (assigning to a ready queue) and dispatching (giving control of central processing means 16) the tasks for central processing means 16 are carried out under the control of operating system 26. Operating system 26 comprises dispatcher 44, scheduler 46, interrupt handler 48, and I/O routines 49, as well as other portions not pertinent to the present invention and not described herein.

Timer 50 may be provided as part of operating system 26 or otherwise within system 10. Timer 50 awaits completion of a time interval defined by a time interval limiting value signal (as described below), and provides a timer interrupt signal in response to the completion of such interval.

Dispatcher 44. When operating under the control of dispatcher 44, central processing means 16 is responsive to a dispatch signal (provided in a manner to be explained) for retrieving from ready queues 42 the address value signals representing the location of the task control block 30 associated with the identified next task. This is accomplished by examining each ready queue in turn, beginning with queue O, to find out whether there is a task in the queue. If a task is found queued at the head of queue O, it is dispatched. If not, queue 1 is examined, and so forth, in a manner will understood in the art. Thus, queue O must be empty before any task in queue 1 will be dispatched. Each time means 16 operates according to dispatcher 44 (that is, each time the central processing means is available) the queues are again examined beginning with queue O.

Further operating under the control of dispatcher 44, central processing means 16 is responsive to the address value signals retrieved from ready queues 42, corresponding with the identified next task, for locating the associated task control block 30 and retrieving state signals from elements 32, and placing the state signals into the central processing means state register means 24, thereby giving control of the central processing means to the next task.

Storage means 12 further provides a time interval limiting value signal 52. When a next task is dispatched, timer means 50 awaits completion of a time interval, referred to as a "time-slice". The interval is defined by the limiting value signal.

When a task has been given control of central processing means 16, means 16 proceeds to execute the instructions of the appropriate program. It is observed that tasks go through cycles of two alternating phases: a first phase of exclusively CPU execution (during which a plurality of instructions are executed) and a second phase during which the task waits for I/O service, as for example to read in or write out signals from or to a disk 18, or to print out results or messages on a printer 20. Whether during each time interval the central processing means 16, operating under the control of the next task, either requires or does not require an I/O (or other non-CPU) service is a significant fact to which the operating system responds, as will be described.

I/O service call. When an I/O service is required by a task, central processing means 16 ceases execution of the task, and provides a signal representing a call for the service, which results in subsequent operation of central processing means 16 under the control of I/O routines 49. The task is described as having "voluntarily" given up control of central processing means 16. Under the control of I/O routines 49, central processing means 16 is responsive to the call signal for placing the address value signals associated with the currently executing task at the tail 40 of I/O queue 36.

I/O completion. When a physical I/O function has been completed for a particular concurrent task, an I/O interrupt signal is generated. In response to the I/O interrupt signal, central processing means 16 under control of interrupt handler 48 provides a first interrupt handler means signal which causes a transfer of control to scheduler 46. Under the control of scheuler 46, central processing means 16 resets the dispatch priority signal 34 of the particular task to a new value representing a higher priority (in general, the priority is incremented by one), and places the address value signals for the address value associated with the task control block for that task at the tail of a ready queue 42 corresponding to the new dispatch priority. (If the previous dispatch priority value placed the task at the highest priority queue, the priority value is (reset to its previous (old) value.) In alternative implementations, the dispatch priority may be reset in response to the I/O call rather than the I/O completion; this is not material to the present invention. CPU means 16 further provides a dispatch signal, which results in operation according to dispatcher 44 as has been described.

Time-slice runout. Timer 50 provides a timer interrupt signal in response to the completion of the time interval defined by limiting value signal 52. If no request for I/O (or other non-CPU) services is made before the completion of the time interval, the executing task is said to have "run out its time-slice"; it needs the services of central processing means 16 for a further time before it reaches the point of requiring an I/O or other service. At the completion of the time-slice, timer 50 provides a timer interrupt signal. Central processing means 16 then operates under the control of interrupt handler 48, and is responsive to the timer interrupt signal for discontinuing execution of the currently executing task. Means 16 retrieves the current state signals from register means 24 and places such signals into the state register means 32 of the task control block data structure 30 associated with the discontinued task, and provides a second interrupt handling means signal.

In response to such signal, central processing means 16 operates further according to scheduler 46, and resets dispatch priority signal at 34 in the task control block of the discontinued task to a value representing a lower priority (in general, the priority is decremented by one); central processing means 16 further places the address signals associated with the discontinued task at the tail 43 of a ready queue 42 corresponding to the new dispatch priority. As before, if the old priority value placed the task in the lowest priority queue, the priority value is reset to its previous (old) value. Means 16 under the control of scheduler 46 provides the dispatch signal, which results in operation according to dispatcher 44 as has been described.

I/O bound and CPU bound tasks. When a plurality of concurrent tasks of various kinds are present in a data processing system, each task will, during any particular period of time which is long compared with an execution cycle time of the central processor, have a characteristic execution time for which it uses the central processing means before voluntarily giving up control in order to get an I/O or other non-CPU service (CPU burst time). Different tasks will have different characteristic CPU burst times. Thus there will be a distribution of CPU burst times, from a few milliseconds to as much as several hundred milliseconds. It is commonly said that at any particular time the concurrent tasks fall into two categories, referred to as "I/O bound" and "CPU bound", and corresponding generally to different values of the characteristic cpu burst times.

For a data processing system for which the present invention has been implemented, a task is described as "I/O bound" if its characteristic CPU burst time is about 15 ms. A task is described as "CPU bound" if its characteristic CPU burst time is about 60 ms. In general, these values depend on the particular data processing system.

Generally, apart from limitations imposed by the speed with which the system I/O devices operate, I/O bound tasks are considered to be limited in the speed with which they are carried out by the availability of I/O devices, that is, by the time they spend waiting in an I/O queue.

In contrast, apart from the speed of CPU operations, CPU bound tasks are considered to be limited in the speed with which they are carried out by the availability of the central processor, that is, by the time they spend waiting in a ready queue. Any particular applications program may at different times during its execution fall into first one and then the other of these categories. Generally (and desirably for efficient use of the system components) a mix of tasks is present in a system at any particular time, some being I/O bound and some CPU bound. No rigorous definition of these categories is necessary.

User-set priorities. In many data processing systems, a task is assigned to a range of ready queues corresponding with a user-set priority, and fewer in number than the total number N of ready queues provided by system 10. The dispatch priority is repeatedly reset as described above responsive to the behavior of the task (that is, whether or not it runs out its time-slice) but it cannot be reset to place the task in a queue outside its assigned range. According to the prior art, the ranges for particular user-set priorities are disjoint. For example, a range of ready queues 4-8 might be assigned to applications tasks of a particular priority, and a range of queues 9-13 to a second set of applications tasks. A task of the second priority cannot rise to any of queues 4-8, nor can any task of the first priority fall to any of queues 9-13. As has been described, whenever a task is present in any of queues 4-8 it will be dispatched ahead of any task present in queues 9-13. That means that if a task on one of queues 4-8 is heavily CPU bound, it is repeatedly reassigned to one of these queues and repeatedly gains control of the CPU; it can "lock out" an I/O bound task in one of queues 9-13, that is, prevent it from gaining control of the central processing means and thus significantly degrade its performance.

Further according to the prior art, if more than one time-slice value is employed, the values are permanently associated with particular ready queues.

It has been found that with the scheduling and dispatching method described above, it is possible for a highly CPU bound task having a high user-set priority to lock out a task having a lower user-set priority, even though the latter task may be highly I/O bound and may require only a portion of a single time-slice before voluntarily giving up control of the central processing means.

In particular, it has been found that foreground tasks (such as interactive tasks) which are heavily CPU bound severely limit the throughput of I/O bound background tasks (such as batch jobs). While this may be acceptable in some circumstances, in other circumstances it is unacceptable. The present invention provides means for preventing this undesirable mode of operation.

The present invention. According to the present invention, storage means 12 further provides a radius storage element 54, providing at least one queue radius signal. The queue radius signals may represent an equal number of queues. Alternatively they may represent an equal number of queues above and below a middle queue; in such case, the total number of queues is odd. Alternatively, there may be unequal numbers of queues above and below a dividing line.

Each task control block 30 has a queue range divider storage element 56 providing a queue range divider signal. The divider signal is derived from a user-set priority (commonly selected from very high, high, medium and low) for the task associated with the task control block. The divider signal may, however, also depend on other factors, such as whether the task is foreground or background. In such case there will be eight categories of tasks, represented by the divider signal. Other numbers of categories may be used.

The range divider signal and the radius signals together define for each concurrent task a subset of M queues, where M is less than N (the total number of ready queues), divided into upper and lower ranges, and including a highest and a lowest priority queue for the task. According to the invention, the queue subsets of the concurrent tasks are overlapped; that is, the queue subset of any concurrent task has at least one queue in common with the queue subset of any other concurrent task. In preferred embodiments, the overlap is greater, as will be discussed below.

For each task, central processing means 16 operating under the control of scheduler 46, in addition to being responsive to the dispatch priority signal 34, is responsive to the queue range divider signal 56 and to the queue radius signals 54 for placing the associated task control block address signals in a particular ready queue 42 within the queue subset defined for the task. While the change in dispatch priority (corresponding to whether or not the task has most recently run out its time-slice) causes the task to be assigned to successive queues within the subset, the task cannot be assigned to a queue outside the subset defined for that task. The subset boundaries override the dispatch values, and the task is reassigned to its previous queue.

Further according to the invention, data storage means 12 further provides a plurality of time-slice value storage elements 58 providing at least two time-slice signals, representing at least two discrete time-slice values. The time-slices increase successively; thus, for example, a sequence of time-slice values of 8, 15, 20, 30 and 40 may be provided. For each task, central processing means 16 operating according to dispatcher 46 is responsive to queue range divider signal 56 for providing a time interval limiting value signal 52 responsive to the shortest time-slice value signal when the task control block address signals are retrieved from a ready queue 42 having the highest priority of the appropriate queue subset, and providing a time interval limiting value signal 52 responsive to the longest time-slice value signal when the task control block address signals are retrieved from the ready queue 42 having the lowest priority of the subset; the intermediate time-slice values are associated with the intermediate priority queues in any appropriate manner such that as tasks behave in a more highly I/O bound manner they are dispatched with relatively shorter time-slices, and as they behave in a more highly CPU bound manner they are dispatched with relatively longer time-slices. Thus, instead of being permanently or absolutely associated with a particular queue, a time-slice value is associated with the relative position of that queue within the queue subset of a particular task.

In preferred embodiments of the invention, data storage means 12 provides first and second time-slice value storage elements 58 providing first and second time-slice signals, representing the values of shorter and longer time-slices respectively. For each task, central processing means 16 operating according to dispatcher 46 is responsive to queue range divider signal 56 for providing a time interval limiting value signal 52 responsive to the first time-slice value signal when the task control block address signals are retrieved from a ready queue 42 in the upper range of the appropriate queue subset, and providing a time interval limiting value signal 52 responsive to the second time-slice value signal when the task control block address signals are retrieved from a ready queue 42 in the lower range.

Thus, within any category of tasks having the same priority and hence having the same queue subset, the I/O bound tasks will drift to the upper range (because the dispatch priority is repeatedly incremented when the task calls for a non-CPU service before the end of the time-slice) and are dispatched before the CPU bound tasks, which drift to the lower range (because the dispatch priority is repeatedly decremented when the task runs out its time-slice).

The task range divider values represented at 56 for all the concurrent tasks and the radius values represented at 54 are related such that any task to be dispatched with the first (shorter) time-slice value can be assigned to a queue having priority at least equal to that of the highest priority queue to which any other task to be dispatched with the second (longer) time-slice value can be assigned. Thus the I/O bound task, though of low priority, is placed in a queue with the higher priority CPU bound task, and cannot be locked out by the latter. The CPU bound task will be dispatched with the longer time-slice, but the I/O bound task will in its turn be dispatched before the CPU bound task is again dispatched.

If desired, for a particular mix of tasks, the overlap of queues may in fact be greater, such that the lowest priority I/O bound task can be placed in one of three queues (or more) of priority higher than that to which the highest priority CPU bound task can be assigned. Varying the amount of queue subset overlap has the effect of giving more or less weight to the user-set priority and to the priority based on task behavior.

Figures 2, 3:
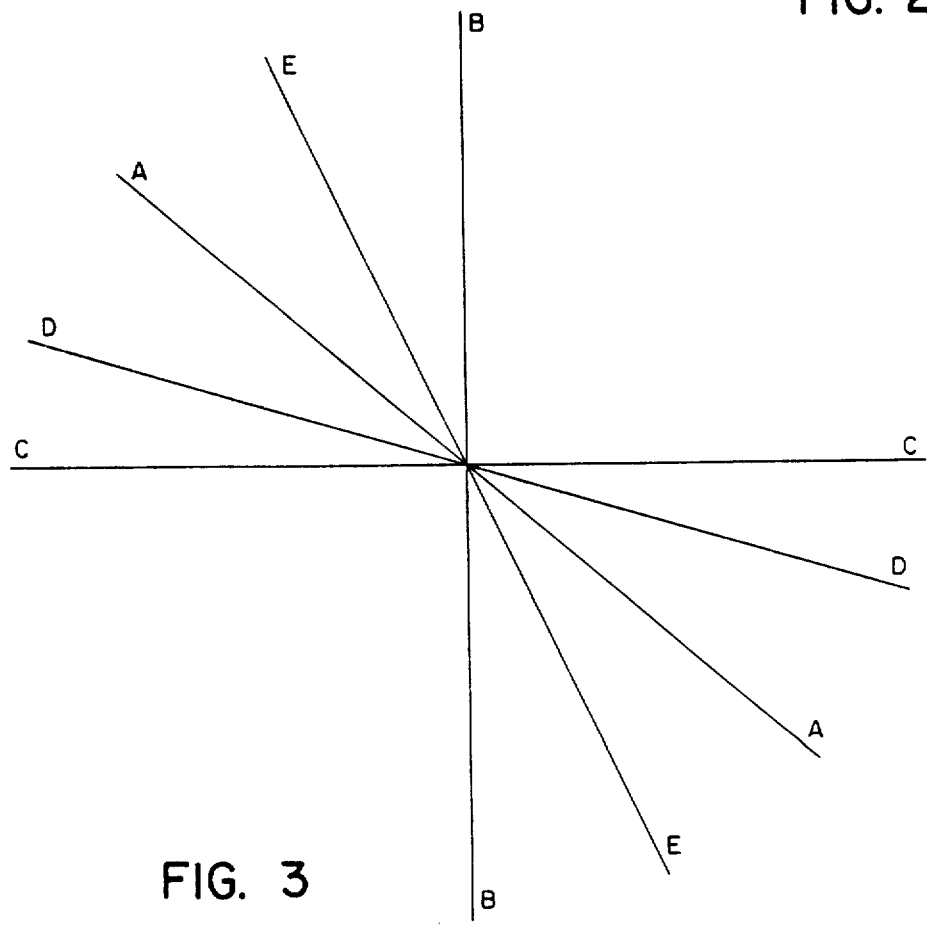
FIG. 2 illustrates a particular implementation of the invention.
FIG. 3 illustrates variations of the implementation of FIG. 2.

Referring now to FIG. 2, a particular implementation of a preferred embodiment is shown by way of example. It is assumed that 20 ready queues 42 are available for applications tasks, having priorities from 4 through 23. (Queues 1-3 are for systems tasks only, and applications tasks cannot be assigned to them.) In this example there are eight categories of tasks based on the attributes FG (foreground) and BG (background), VH (very high), H (high), M (medium) and L (low). Radius signals are provided at 54 defining an upper range (including the divider queue) of seven, and a lower range (below the divider queue) of six, making a subset of 13 queues.

For each FG/VH task, a signal is provided at 56 representing a divider queue equal to queue 10. The subset of queues for a FG/VH task therefore has a highest priority queue equal to queue 4, and a lowest priority queue equal to queue 16. When a FG/VH task is dispatched from any of queues 4 through 10 (where it is found because its recent behavior has been generally I/O bound), it is dispatched with a time-slice value of 8 ms; when it is dispatched from any of queues 11 through 16 (where it is found because its recent behavior has been more or less CPU bound), it is dispatched with a time-slice value of 45 ms.

In contrast, a BG/L task cannot be assigned to any queue above queue 11, and its lowest priority queue is queue 23. However, it will be noted that when a BG/L task is dispatched from queue 11, it is dispatched with a time-slice value of 8 ms (appropriate for an I/O bound task), whereas when a FG/VH task is dispatched from the same queue it is dispatched with a time-slice value of 45 ms (appropriate for a CPU bound task). In the particular implementation described, not enough ready queues are available to permit assigning the BG/L task with highest dispatch priority to a queue above the FG/VH CPU bound task; thus the two tasks must compete in a single queue, and the BG/L task must sometimes wait until the FG/VH task enjoys a 45-ms time-slice. It would however be desirable to avoid such competition if the particular system permits it, by providing greater overlap.

The effect of providing two time-slice values is that a task, during most of the time it is present in the system, will be scheduled in one of four disjoint regions within its queue subset: the top region (when the task is I/O bound); the region just above and including the divider queue (when the task is moderately I/O bound); the region just below the divider queue (when the task is moderately CPU bound); or the bottom region (when the task is CPU bound).

Because each of these regions, for each category of task, includes at least one ready queue other than those comprising the same region for other categories, tasks running particular programs with high priority will receive preferential treatment as compared with tasks running the same programs with low priority.

Further, since the I/O bound queues (the upper range) of even the lowest priority group (BG/L) are the same as or, desirably, higher than those of the CPU bound queues (lower range) of the highest priority group (FG/H), CPU bound tasks will not prevent any I/O bound task from obtaining service from the central processing means. This maximizes system resource utilization and performance.

Two unequal time-slice values will provide a considerable advantage in the operation of the data processing system, as I/O bound tasks will be discriminated from CPU bound tasks. However, the advantage can be increased by optimizing the choice of time-slice values.

In preferred embodiments, a shorter time-slice value has been chosen which is between $\frac{1}{2}$ and $1 \times$ the average CPU burst time time of I/O bound tasks. Consequently, on the average, an I/O bound task will run out its first time-slice without issuing a call for I/O services, with the result that its dispatch priority will be decremented and it will be assigned to a lower priority queue. However, on the average, the task will call for I/O services during its second time-slice, with the result that its dispatch priority will be incremented, or restored to the value of the dispatch priority before the first time-slice. Thus on the average an I/O bound task will remain in an initially assigned queue, so long as its behavior does not alter significantly. From time to time the task will require three time-slices before issuing an I/O call, thus having its dispatch priority lowered twice, but this will be infrequent, and will be balanced by occasions when the task will issue I/O calls in successive time-slices, thus raising its dispatch priority again.

Analogous behavior can be expected for CPU bound tasks if the second time-slice value is chosen to be between $\frac{1}{2}$ and $1 \times$ the average CPU burst time of CPU bound tasks. It has been found, in fact, that most program behavior causes tasks to "jiggle" or "float" over a range of three queues for periods of time which are long compared with the time-slice; thus each of the four regions discussed above is preferably three queues in length. When the behavior of the task changes, the task moves with a generally consistent drift to one of the other regions. It has been found that tasks spend comparatively little time in queues intermediate these regions, if such are provided. Therefore, in preferred embodiments, four 3-queue regions, or 12 queues in all, comprise a queue subset. In the implementation shown in FIG. 2, 13 queues are provided because of an implementation detail in the particular system for which it is designed, requiring that there be an odd number of queues. It is found in practice that tasks are seldom assigned to queue 4.

The time-slice values represented at 58 and the divider values represented at 56 are parameters which may be easily changed to alter the performance of system 10. Thus the scheduler and dispatcher of operating system 26 are said to be "tunable". The effect of altering the size of the queue overlap by varying the divider values will now be discussed.

Referring again to FIG. 2, it will be observed that a line A may be drawn which separates the region with which 8-ms time-slices are associated from the region with which 45-ms time-slices are associated. Line A slants downward from the left at an acute angle to the horizontal. Referring now to FIG. 3, line A is again represented. Conceptually, in the region above and to the right of line A are I/O bound tasks, in all user-set priority categories, while below and to the left of line A are CPU bound tasks, in all user-set priorities. This case corresponds to a minimum overlap of 6 queues between queue subsets of highest and lowest priorities (an overlap of 11 queues between adjacent queue subsets), and has been noted, the most I/O bound task in the BG/L category may be queued with the least CPU bound task in the FG/VH category, in queue 11.

Consider now the case, as in the prior art previously discussed, in which no overlap is permitted among the queue subsets for each user-set priority category of tasks. In this case, all tasks in, for example, queues 4-8 will be dispatched ahead of all tasks in queues 9-13. An I/O bound task in the 9-13 queue subset will rise, as its dispatch priority is repeatedly incremented, to queue 9; a CPU bound task in the 4-8 queue subset will fall, as its dispatch priority is repeatedly decremented, to queue 9; nevertheless, the I/O bound tasks in queue 9, even though dispatched with a relatively short time-slice, can be locked out by the CPU bound task in queue 8, even though dispatched with a relatively long time-slice. This non-overlapped allocation of queues is represented in FIG. 3 by a vertical line B. While high priority tasks receive good service in this scheme, during times of heavy system use low priority tasks may be locked out.

If, in contrast, all tasks, regardless of user-set priorities, are allowed to move to any ready queue (that is, there are no queue subsets associated with user-set priorities) then all I/O bound tasks will rise to the upper queues (and be dispatched with a relatively short time-slice) while all CPU bound tasks will fall to the lower queues and be dispatched with a relatively long time-slice. In essence, all I/O bound tasks will run ahead of all CPU bound tasks. Such a situation is represented in FIG. 3 by a horizontal line C. This allocation of queues is also known in the prior art. The disadvantage of this arrangement is that foreground or other high user-set priority tasks receive no better service than background tasks; if system use is heavy, the response time of foreground (interactive) tasks may be seriously degraded while the system runs I/O bound background tasks.

In contrast with both these extremes of the prior art, represented by lines B and C, a data processing system operating according to the present invention provides a better balance between the priority categories, and provides increased system throughput. Such throughput can be considered quantitatively in terms, for example, of number of transactions per hour, or number of standard job completions per hour, or other appropriate benchmark, as is well understood in the art.

When the minimum queue overlap between queue subsets is increased, the line dividing the I/O bound region from the CPU bound region tilts toward the horizontal line C (which represents complete overlap) as seen at D; when the minimum queue overlap is decreased, the line dividing the two regions tilts toward the vertical line B (in which there is no overlap among queues). Such tuning of the system can be carried out in response to various operational factors, as well as to provide the degree of prioritizing that is desired in a particular installation.

It will be recognized that the invention can be practiced with respect to only a portion of the ready queues of the system, while other portions of the ready queues may be allocated to tasks in the manner known in the prior art. Further, it will be recognized that the range divider values need not vary uniformly from priority category to priority category; if desired in a particular implementation, for example, the two lowest priority categories could be provided with divider signals such that their queue subset overlap with the remaining categories was much smaller than the overlap among the remaining categories. In such case the two regions (I/O bound and CPU bound) would not be dividable by a straight line as shown in FIGS. 2 and 3.

What is claimed is:

1. In a multiprogrammed data processing system for the execution of a plurality of concurrent tasks, having
   timer means,
   data storage means,
   input/output means, and
   central processing means for controlling said data storage means and said input/output means, and providing state register means,
   said data storage means having
     means for providing signals representing operating system means for the control of said data processing system,
     storage elements for signals defining a master control block data structure associated with operation of said central processing means under control of said operating system means, and
     storage elements for signals defining a plurality of task control block data structures,
   each said task control block data structure being associated with one of a plurality of concurrent tasks in said data processing system, each task control block data structure having an associated address value representing its location within said data storage means, each task control block data structure providing storage elements for state signals representing a current execution state of said associated task, and a priority storage element for storing a dispatch priority signal corresponding to a dispatch priority value,
   said master control block data structure providing a plurality of queue storage elements for signals representing particular said address values, said storage elements identifying the head and tail of at least one chained I/O wait queue representing tasks queued for service by said input/output means, and identifying the head and tail of each of N successive chained ready queues representing tasks queued for service by said central processing means, each said ready queue having a queue priority for such service associated with its position from 0, said queue priorities together with the positions of said tasks within said ready queues together identifying a next task,
   said operating system means comprising dispatcher means, scheduler means, input/output routine means, and interrupt handling means,
   said dispatcher means comprising
     means responsive to a dispatch signal for retrieving from said ready queues, address value signals representing the location of said task control block associated with said identified next task,
     means responsive to said retrieved address value signals for retrieving said state signals from said associated said task control block, and placing said retrieved state signals into said central processing means state register means, thereby giving control of said central processing means to said next task,
   said input/output routine means being responsive to signals from said central processing means representing a call from an executing task for service by said input/output means for placing said associated address value signals at the tail of a said I/O queue, and said scheduler means being responsive to said calling task dispatch priority signal representative of an old dispatch priority value for resetting said dispatch priority signal to represent a new higher dispatch priority value, and for providing said dispatch signal, said interrupt handling means being responsive to an I/O interrupt signal representing completion of an input/output function for one of said concurrent tasks, for providing a first interrupt handling means signal, said scheduler means being responsive to said first interrupt handling means signal and to said dispatch priority signal of said task control block associated with said one task, for placing associated said address value signals at the tail of a corresponding said ready queue, said data storage means further providing a time interval limiting value signal, and said timer means being responsive to said dispatcher means for awaiting completion of a time interval defined by said time interval limiting value signal and commencing when said retrieved state signals are placed in said state register means, said timer means being responsive to the completion of said time interval for providing a timer interrupt signal, said interrupt handling means being responsive to said timer interrupt signal for discontinuing execution of the currently executing task, for retrieving current said state signals from said central processing means, for placing said state signals into said task control block storage elements of the said task control block associated with said discontinued task, and for providing a second interrupt handling means signal to said scheduler means, said scheduler means being responsive to said second interrupt handling means signal and to said discontinued task dispatch priority signal representative of an old dispatch priority value for resetting said dispatch priority signal to represent a new lower dispatch priority value, and for placing address signals associated with said task control block of said discontinued task at the tail of a said ready queue corresponding to said new dispatch priority value, that improvement wherein said data storage means further provides at least one radius storage element providing a queue radius signal, said queue radius signal being representative of a total number of queues M less than N, each said task control block having a queue range divider storage element providing a queue range divider signal, said divider signal being derived from a user-set priority for said associated task, said range divider signal and said range radius signals together defining for each said task a subset of queues divided into upper and lower ranges, and including highest and lowest priority queues for the task, the queue subset of any concurrent task having at least one queue in common with the queue subset of any other concurrent task, providing overlapped queue subsets, for each task, said scheduler means being additionally responsive to said queue range divider signal and said queue radius signals for placing said associated task control block address signals in a particular ready queue within said queue subset defined for said task.

2. The improvement of claim 1, said data storage means further providing first and second time-slice value storage elements providing first and second time-slice signals, representing values of shorter and longer time-slices respectively, for each task, said dispatcher means being responsive to said queue range divider signal and to said queue radius signal for providing a time interval limiting value signal responsive to said first time-slice value signal when said task control block address signals are retrieved from a ready queue in said queue subset upper range, and providing a time interval limiting value signal responsive to said second time-slice value signal when said task control block address signals are retrieved from a ready queue in said queue subset lower range, said task range divider values and said radius values being related such that any task to be dispatched with said first time-slice value can be assigned to a queue having priority at least equal to that of the highest priority queue to which any other task to be dispatched with said second time-slice value can be assigned.

3. The improvement of claim 1, said data storage means further providing a plurality of time-slice storage elements providing a plurality of discrete time-slice values, including a shortest and a longest time-slice value and monotonically increasing therebetween, for each task, said dispatcher means being responsive to said queue range divider signal and to said queue radius signal for providing a time interval limiting value signal responsive to said shortest time-slice value when said task control block address signals are retrieved from said highest priority queue in said subset, and providing a time interval limiting value signal responsive to said longest time-slice value when said task control block address signals are retrieved from said lowest priority queue in said subset, and providing time interval limiting value signals responsive to said monotonically increasing time-slice values corresponding to the remaining queues of the subset of monotonically decreasing priority.

4. The improvement of claim 2, said first time-slice signal representing a value of between $\frac{1}{2}$ and 1 times the average CPU burst time of the I/O bound tasks concurrently running in said data processing system.

5. The improvement of claim 2, said second time-slice signal representing a value of between $\frac{1}{2}$ and 1 times the average CPU burst time of the CPU bound tasks concurrently running in said data processing system.

6. The improvement of claim 2, said process range divider values and said radius values being related such that any process to be dispatched with said first time-slice value can be assigned to a queue having priority at least two increments higher than that of the highest priority queue to which any other process to be dispatched with said second time-slice value can be assigned.

7. In a multiprogrammed data processing system for the execution of a plurality of concurrent tasks, having timer means, data storage means, input/output means, and central processing means for controlling said data storage means and said input/output means, and providing state register means, said data storage means having means for providing signals representing operating system means for the control of said data processing system, storage elements for signals defining a master control block data structure associated with operation of said central processing means under control of said operating system means, and storage elements for signals defining a plurality of task control block data structures, each said task control block data structure being associated with one of a plurality of concurrent tasks in said data processing system, each task control block data structure having an associated address value representing its location within said data storage means, each task control block data structure providing storage elements for state signals representing a current execution state of said associated task, and a priority storage element for storing a dispatch priority signal corresponding to a dispatch priority value, said master control block data structure providing a plurality of queue storage elements for signals representing particular said address values, said storage elements identifying the head and tail of at least one chained I/O wait queue representing tasks queued for service by said input/output means, and identifying the head and tail of each of N successive chained ready queues representing tasks queued for service by said central processing means, each said ready queue having a queue priority for such service associated with its position from, said queue priorities together with the positions of said tasks within said ready queues together identifying a next task, said operating system means comprising dispatcher means, scheduler means, input/output routine means, and interrupt handling means, said dispatcher means comprising means responsive to a dispatch signal for retrieving from said ready queues, address value signals representing the location of said task control block associated with said identified next task, means responsive to said retrieved address value signals for retrieving said state signals from said associated said task control block, and placing said retrieved state signals into said central processing means state register means, thereby giving control of said central processing means to said next task, said input/output routine means being responsive to signals from said central processing means representing a call from an executing task for service by said input/output means for placing said associated address value signals at the tail of a said I/O queue, and said scheduler means being responsive to said calling task dispatch priority signal representative of an old dispatch priority value for resetting said dispatch priority signal to represent a new higher dispatch priority value, and for providing said dispatch signal, said interrupt handling means being responsive to an I/O interrupt signal representing completion of an input/output function for one of said concurrent tasks, for providing a first interrupt handling means signal, said scheduler means being responsive to said first interrupt handling means signal and to said dispatch priority signal of said task control block associated with said one task, for placing associated said address value signals at the tail of a corresponding said ready queue, said data storage means further providing a time interval limiting value signal, and said timer means being responsive to said dispatcher means for awaiting completion of a time interval defined by said time interval limiting value signal and commencing when said retrieved state signals are placed in said state register means, said timer means being responsive to the completion of said time interval for providing a timer interrupt signal, said interrupt handling means being responsive to said timer interrupt signal for discontinuing execution of said currently executing task, for retrieving current said state signals from said central processing means, for placing said state signals into said task control block storage elements of the said task control block associated with said discontinued task, and for providing a second interrupt handling means signal to said scheduler means, said scheduler means being responsive to said second interrupt handling means signal and to said discontinued task dispatch priority signal representative of an old dispatch priority value for resetting said dispatch priority signal to represent a new lower dispatch priority value, and for placing address signals associated with said task control block of said discontinued task at the tail of a said ready queue corresponding to said new dispatch priority value, that improvement wherein said data storage means further provides at least one radius storage element providing a queue radius signal, said queue radius signals being representative of a total number of queues M less than N, each said task control block having a queue range divider storage element providing a queue range divider signal, said divider signal being derived from a user-set priority for said associated task, said range divider signal and said range radius signals together defining for each said task a subset of queues divided into upper and lower ranges, said upper and lower ranges being equal to within one queue, the queue subset of any concurrent task having at least one queue in common with the queue subset of any other concurrent task, providing overlapped queue subsets, for each task, said scheduler means being additionally responsive to said queue range divider signal and said queue radius signals for placing said associated task control block address signals in a particular ready queue within said queue subset defined for said task, said data storage means further providing first and second time-slice value storage elements providing first and second time-slice signals, representing values of shorter and longer time-slices respectively, for each task, said dispatcher means being responsive to said queue range divider signal and to said queue radius signal for providing a time interval limiting value signal responsive to said first time-slice value signal when said task control block address signals are retrieved from a ready queue in said queue subset upper range, and providing a time interval limiting value signal responsive to said second time-slice value signal when said task control block address signals are retrieved from a ready queue in said queue subset lower range, said task range divider values and said radius values being related such that any task to be dispatched with said first time-slice value can be assigned to a queue having priority at least equal to that of the highest priority queue to which any other task to be dispatched with said second time-slice value can be assigned, said first time-slice signal representing a value of between $\frac{1}{2}$ and 1 times the average CPU burst time of the I/O bound tasks concurrently running in said data processing system, and said second time-slice signal representing a value of between $\frac{1}{2}$ and 1 times the average CPU burst time of the CPU bound tasks concurrently running in said data processing system.

8. A multiprogrammed computer in which a plurality of tasks are executing concurrently, each task having an associated dispatch priority value signal representative of an associated dispatch priority, said computer providing a central processor, timing means for defining a time interval, queue storage means for representing a plurality N of ready queues comprising representations of tasks queued for control of said central processor, each queue having a queue priority associated with its position from 1 to N, said queue priorities together with the positions of the task representations within said queues together defining a next task, dispatching means responsive to said queue storage means for giving said defined next task control of said central processor, and for starting said timing means, said defined next task thereby being dispatched, operating system means responsive to said central processor and to said timing means for recognizing when a said dispatched task requests suspension of control of said central processor before the end of a said defined time interval and for associating with such task an improved dispatch priority value, and for recognizing when a said dispatched task has controlled said central processor for a time period at least equal to said defined interval and for associating with such task a worsened dispatch priority value, range limit storage means for providing queue range limit signals representative of values defining a total number of said ready queues M less than N, said range limit signals defining for each task an associated subset of said ready queues, including highest and lowest priority ready queues for that task, the ready queue subset of any concurrent task having at least one queue in common with the ready queue subset of any other concurrent task, providing overlapped ready queue subsets, said computer further providing scheduler means responsive, for each task awaiting control of said central processor, to its said associated dispatch priority value signal and to its said queue range limit signals for placing a representation of said task in a particular ready queue within said ready queue subset defined for said task.

9. The computer of claim 8, further comprising time-slice means for defining shorter and longer time slices, said range limit signals comprising range radius signals and for each concurrent task, range divider signals, said range divider signals and said range radius signals together defining upper and lower ranges for each ready queue subset, for each said defined next task, said dispatcher means being responsive to its said queue range divider signal, its said associated dispatch priority value signal, and to said time-slice means for causing said timing means to define a time interval equal to a said shorter time slice when said task is dispatched from a ready queue in said queue subset upper range for said task, and for causing said timing means to define a time interval equal to a said longer time slice when said task is dispatched from a ready queue in said queue subset lower range for said task.

10. A multiprogrammer data processing system for the execution of a plurality of concurrent tasks, having timer means, data storage means, and central processing means for controlling said data storage means, and providing state register means, said data storage means having means for providing signals representing operating system means for the control of said data processing system, storage elements for signals defining a master control block data structure associated with operation of said central processing means under control of said operating system means, and storage elements for signals defining a plurality of task control block data structures, each said task control block data structure being associated with one of a plurality of concurrent tasks in said data processing system, each task control block data structure having an associated address value representing its location within said data storage means, each task control block data structure providing storage elements for state signals representing a current execution state of said associated task, and a priority storage element for storing a dispatch priority signal corresponding to a dispatch priority value, said master control block data structure providing a plurality of queue storage elements for signals representing particular said address values, said storage elements identifying the head and tail of each of N successive chained ready queues representing tasks queued for control by said central processing means, each said ready queue having a queue priority associated with its position from 1 to N, said queue priorities together with the positions of said tasks within said ready queues together defining a next task to be given such control, said operating system means comprising dispatcher means, scheduler means, and interrupt handling means, said dispatcher means comprising means responsive to a dispatch signal for retrieving from said ready queues, address value signals representing the location of said task control block associated with said defined next task, means responsive to said retrieved address value signals for retrieving said state signals from said associated task control block, and placing said retrieved state signals into said central processing means state register means, thereby giving control of said central processing means to said defined next task, said next task thereby becoming the executing task, said data storage means further providing a time interval limiting value signal, and said timer means being responsive to said dispatcher means for awaiting completion of a time interval defined by said time interval limiting value signal, said timer means being responsive to the completion of said time interval for providing a timer interrupt signal, said interrupt handling means being responsive to said timer interrupt signal for discontinuing execution of the executing task, for retrieving current said state signals from said central processing means, for placing said state signals into said task control storage elements of the said task control block associated with said discontinued task, and for providing an interrupt handling means signal to said scheduler means, said executing task thereby becoming a discontinued task, said scheduler means being responsive to said interrupt handling means signal and to said discontinued task dispatch priority signal representative of an old dispatch priority value for resetting said dispatch priority signal to represent a new lower dispatch priority value, and for placing address signals associated with said task control block of said discontinued task into a said ready queue corresponding to said new dispatch priority value, and for providing a dispatch signal, said operating system means being responsive to signals from said central processing means representing request for suspension of processing of said executing task, before completion of said time interval, pending an awaited event, for retrieving current said state signals from said central processing means, said executing task thereby becoming a suspended task, for placing said state signals into said task control block storage elements of the said task control block associated with said suspended task, and responsive to said suspended task dispatch priority signal representative of an old dispatch priority value for resetting said dispatch priority signal to represent a new higher dispatch priority value, and for providing a said dispatch signal, said scheduler means being thereafter responsive to a signal from said central processing means representing occurrence of said awaited event and to said dispatch priority signal of said task control block associated with said suspended task, for placing associated said address value signals into a corresponding said ready queue, said data storage means further providing at least one range limit storage element providing range limit signals, said range limit signals being representative of values defining a total number of ready queues M less than N, said range limit signals defining for each said task a subset of ready queues including highest and lowest priority ready queues for the task, the ready queue subset of any concurrent task having at least one ready queue in common with the ready queue subset of any other concurrent task, providing overlapped ready queue subsets, for each task, said scheduler means being additionally responsive to said dispatch priority signal and said range limit signals for placing said associated task control block address signals in a particular ready queue within said ready queue subset defined for said task.

11. A multiprogrammed computer in which a plurality of tasks share use of a central processor, each task being associated with a task class, said computer including timing means for measuring duration of servicing a task by said processor, ready queue storage means for storing a representation of a plurality of ready queues having priorities ranked as to better or worse for obtaining service from said processor, said ready queue priorities together with positions of tasks in said ready queues defining a next task for receiving service from said processor, dispatcher means for initiating service from said processor for said next defined task when said procsssor is available, interrupt means for suspending servicing of a task by the processor after service for a service time limit defined prior to start of servicing, range limit storage means for defining for each said task class to which tasks of an associated class may be assigned, the assignable range including a best priority and a worst priority ready queue assignable for each task class, the assignable ranges being defined such that each is unique and such that there is at least one ready queue common to all assignable ranges, a dispatch signal storage means associated with each task for indicating the ready queue to which the task was last assigned, scheduler means for assigning to ready queues tasks requiring service from said processor, said scheduler means assigning a particular task to a ready queue with a worse priority than that to which said particular task was last assigned when said particular task was suspended from its last use of the processor by expiration of its defined service time limit, assigning a particular task to a ready queue with a better priority than that to which said particular task was last assigned when said particular task was not suspended from its last use of the processor by expiration of its defined service time limit, ready queues to which a task is assigned by said scheduler means being, however, restricted to the assignable range of ready queues associated with the particular task.

12. A computer as claimed in claim 11, wherein said assignable ranges of ready queues contain equal numbers of queues and are defined by a stored range divider signal associated with each of said task classes and indicative of a ready queue ranked centrally in the range of the associated task class and a stored radius signal applicable to all task classes and indicative of the number of queues in each range.

13. A computer as claimed in claim 11, wherein said defined service time limit has a plurality of values and is defined for a particular task and particular servicing by the processor with reference to the relative position of the ready queue to which the particular test was last assigned in the range of assignable ready queues associated with the class of the particular task, longer time limits being defined for worse ranked ready queues.

* * * * *